(12) United States Patent
Li (10) Patent No.: US 8,680,823 B2
(45) Date of Patent: Mar. 25, 2014

(54) POWER SUPPLY APPARATUS AND POWER SUPPLY SYSTEM WITH PLURAL POWER SUPPLY APPARATUSES

(75) Inventor: Sheng-Hua Li, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 486 days.

(21) Appl. No.: 13/103,028

(22) Filed: May 6, 2011

(65) Prior Publication Data

US 2012/0139515 A1 Jun. 7, 2012

(30) Foreign Application Priority Data

Dec. 1, 2010 (TW) .............................. 99141707 A (51) Int. Cl.
G05F 1/563 (2006.01)
(52) U.S. Cl.
USPC .............. 323/266; 323/272; 323/299; 363/65
(58) Field of Classification Search
USPC ...................... 323/266, 272, 284, 299; 363/65
See application file for complete search history.

(56) References Cited

U.S. PATENT DOCUMENTS

| | | | | |
|---|---|---|---|---|
| 6,762,595 B2* | 7/2004 | Tamai et al. | ................... | 323/266 |
| 6,771,052 B2* | 8/2004 | Ostojic | ..................... | 323/266 |
| 7,071,660 B2* | 7/2006 | Xu et al. | ....................... | 323/266 |
| 7,173,400 B2* | 2/2007 | Morioka | ....................... | 323/266 |
| 7,456,617 B2* | 11/2008 | Chapuis et al. | ............... | 323/267 |
| 7,969,129 B2* | 6/2011 | Kudo | ............................ | 323/266 |
| 8,040,115 B2* | 10/2011 | Egan et al. | .................... | 323/266 |
| 2008/0197825 A1* | 8/2008 | Siri | ............................... | 323/272 |
| 2010/0264893 A1* | 10/2010 | Li | ............................... | 323/282 |
| 2012/0139515 A1* | 6/2012 | Li | ............................... | 323/282 |

* cited by examiner

Primary Examiner — Jeffrey Sterrett (57) ABSTRACT

A power supply apparatus includes a front-stage power circuit, a bus capacitor, a standby power circuit, a standby power circuit, an auxiliary switching circuit and a controlling unit. The auxiliary switching circuit is electrically connected between the bus capacitor and the standby power circuit. The controlling unit is electrically connected with the auxiliary switching circuit and the front-stage power circuit for controlling operations of the front-stage power circuit and the auxiliary switching circuit. When the input voltage is normal but the front-stage power circuit is disabled, the auxiliary switching circuit is turned off under control of the controlling unit, so that electric energy of the input voltage is transmitted to an input terminal of the standby power circuit through the protecting circuit.

15 Claims, 3 Drawing Sheets

POWER SUPPLY APPARATUS AND POWER SUPPLY SYSTEM WITH PLURAL POWER SUPPLY APPARATUSES

FIELD OF THE INVENTION

The present invention relates to a power supply apparatus and a power supply system, and more particularly to a power supply apparatus and a power supply system for achieving quick-starting, power-saving and cost-effective functions.

BACKGROUND OF THE INVENTION

With increasing development of science and technology, diverse electronic devices are used to achieve various purposes. An electronic device comprises a plurality of electronic components. Generally, different kinds of electronic components are operated by using different voltages.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable.

Generally, power supply apparatuses are classified into two types, i.e. a linear power supply apparatus and a switching power supply (SPS) apparatus. A linear power supply apparatus principally comprises a transformer, a diode rectifier and a capacitor filter. The linear power supply apparatus is advantageous due to its simplified circuitry and low fabricating cost. Since the linear power supply apparatus has bulky volume, the linear power supply apparatus is not applicable to a slim-type electronic device. In addition, the converting efficiency of the linear power supply apparatus is too low to comply with the power-saving requirements. In comparison with the linear power supply apparatus, the switching power supply apparatus has reduced volume but increased converting efficiency. That is, the switching power supply apparatus is applicable to the slim-type electronic device or long-term use.

Conventionally, a switching power supply apparatus comprises a front-stage power circuit, a back-stage power circuit, a bus capacitor and a standby power circuit. The front-stage power circuit and the back-stage power circuit are used for converting electric energy. The bus capacitor is electrically connected with the output terminal of the front-stage power circuit so that the bus capacitor is charged by the electric energy of the front-stage power circuit. In a case that the back-stage power circuit is disabled, the electric energy discharged from the bus capacitor may be provided to the back-stage power circuit so that the back-stage power circuit can continuously provide electric energy to the load for a hold-up time.

The standby power circuit is connected with the output terminal of the front-stage power circuit and the bus capacitor. By the standby power circuit, the electric energy outputted from the front-stage power circuit or the electric energy stored in the bus capacitor may be converted into a standby voltage. The standby voltage may provide electric energy required for powering the internal circuitry or electronic components of the power supply apparatus. For example, the internal circuitry or electronic components of the power supply apparatus includes the front-stage controlling circuit and the back-stage controlling circuit, which are used for controlling the front-stage power circuit and the back-stage power circuit, respectively. Consequently, the electric energy required to start the power supply apparatus may be provided by the standby power circuit.

As known, for allowing the electronic product to receive electric energy with high reliability, the power supply system is usually designed to have a redundancy configuration composed of plural power supply apparatuses. By the redundancy configuration of the power supply system, the electric energy provided by the plural power supply apparatuses are homogenized, and thus the overall electric quantity provided by the power supply system will be increased. Moreover, since the redundancy configuration of the power supply system is composed of plural power supply apparatuses, if one of the power supply apparatuses has a breakdown, the electronic product can be still enabled.

Figure 1:
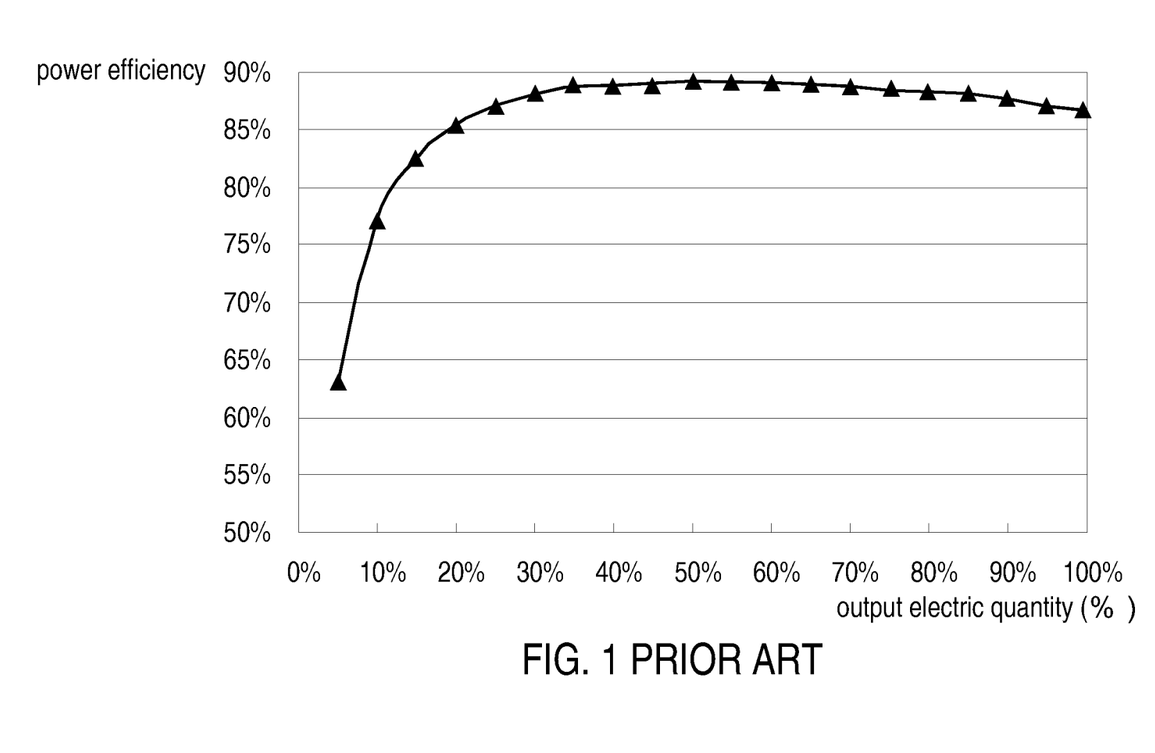
FIG. 1 is a plot illustrating the relationship between the power efficiency and the output electricity of a typical power supply apparatus.

FIG. 1 is a plot illustrating the relationship between the power efficiency and the output electricity of a typical power supply apparatus. Although the redundancy configuration may increase the reliability of the power supply system, there are still some drawbacks. As shown in FIG. 1, when the power supply system provides electric energy to the electronic product in a light load condition, the overall operating efficiency is reduced. For example, if the power supply system has an (n+1) redundancy configuration, the power supply system comprises two power supply apparatuses. Under this circumstance, the electric energy provided by the first power supply apparatus to the electronic product and the electric energy provided by the second power supply apparatus to the electronic product are substantially equal. As shown in FIG. 1, when the power supply system provides electric energy to the electronic product in the light load condition (e.g. the power consumption amount of the electronic product is lower than 40 percentage of the rated power supply amount), the power efficiency of the conventional power supply apparatus is very low. Under this circumstance, the overall operating efficiency of the power supply system is deteriorated.

For solving the above drawbacks, a power supply system is designed to turn on or turn off specified power supply apparatuses according to the load condition in order to enable specified number of power supply apparatuses according to the power consumption amount of the electronic product. Although the power efficiency is increased and the reliability of the redundancy configuration is enhanced, the power supply system needs an additional power distribution unit for detecting the power consumption amount and determining the on/off statuses of the power supply apparatuses. Under this circumstance, the fabricating cost of the power supply system is increased.

Moreover, for reducing power loss to achieve the power-saving efficacy, the power supply apparatus should be instantly started when the power supply apparatus is turned off or in the standby status. For example, when the power supply apparatus is turned off or in the standby status, the back-stage power circuit is turned off but the front-stage power circuit is continuously enabled. In such way, the operating loss of the back-stage power circuit is reduced. Moreover, since the front-stage power circuit is continuously enabled, the front-stage power circuit can continuously provide electric energy to the standby power circuit and the bus capacitor. As such, the standby power circuit can continuously provide the standby voltage to the front-stage controlling circuit and the back-stage controlling circuit. After the back-stage power circuit of the power supply apparatus is turned on, the back-stage power circuit may be instantly enabled under control of the back-stage controlling circuit.

However, since the front-stage power circuit is continuously enabled when the power supply apparatus is turned off or in the standby status, the operating loss of the front-stage power circuit still exists. Under this circumstance, the power-saving efficacy of the conventional power supply apparatus is unsatisfied. Although the front-stage power circuit and the back-stage power circuit may be both turned off when the power supply apparatus is turned off or in the standby status, some problems occur. For example, since the standby power circuit is electrically connected with the output terminal of the front-stage power circuit and the bus capacitor, if the front-stage power circuit is turned off, the electric energy stored in the bus capacitor is converted into the standby voltage to power the front-stage controlling circuit and the back-stage controlling circuit by the standby power circuit. Since the front-stage power circuit is turned off, the front-stage power circuit fails to continuously provide electric energy to the bus capacitor for storage. Under this circumstance, the electric energy stored in the bus capacitor is reduced or exhausted because the electric energy is provided to the standby power circuit. For re-starting the power supply apparatus, a waiting time period is necessary to charge the bus capacitor by the front-stage power circuit. In other words, the power supply apparatus fails to be instantly started because of a response relay.

Therefore, there is a need of providing a power supply apparatus and a power supply system with plural power supply apparatuses so as to obviate the drawbacks encountered from the prior art.

SUMMARY OF THE INVENTION

The present invention provides a power supply apparatus and a power supply system with plural power supply apparatuses. A proper number of power supply apparatuses of the power supply system will be enabled according to the power consumption amount of the system circuit without the need of installing an additional power distribution unit. As a consequence, the power efficiency of the power supply system is enhanced, and the cost of the power supply system is reduced. Moreover, when the power supply apparatus is turned off, the front-stage power circuit and the back-stage power circuit may be turned off under control of the controlling unit. By reducing the operating loss of the front-stage power circuit, the power-saving efficacy of the power supply apparatus is enhanced. When the power supply apparatus is turned on again, the power supply apparatus can be instantly started without response delay.

In accordance with an aspect of the present invention, there is provided a power supply apparatus for converting electric energy of an input voltage to be provided to a system circuit. The power supply apparatus includes a front-stage power circuit, a bus capacitor, a standby power circuit, a standby power circuit, an auxiliary switching circuit and a controlling unit. The front-stage power circuit is used for converting the input voltage into a bus voltage. The bus capacitor is electrically connected with the front-stage power circuit. The standby power circuit is used for outputting a standby voltage. The protecting circuit is electrically connected between the front-stage power circuit and the standby power circuit for flowing electric current in only one direction. The auxiliary switching circuit is electrically connected between the bus capacitor and the standby power circuit. The controlling unit is electrically connected with the auxiliary switching circuit and the front-stage power circuit for controlling operations of the front-stage power circuit and the auxiliary switching circuit. When the input voltage is normal but the front-stage power circuit is disabled, the auxiliary switching circuit is turned off under control of the controlling unit so that electric energy of the input voltage is transmitted to an input terminal of the standby power circuit through the protecting circuit.

In accordance with another aspect of the present invention, there is provided a power supply system for providing a total output electric quantity to a system circuit. The power supply system includes a first power supply apparatus, a second power supply apparatus, a first signal transmission line and a second signal transmission line. The first power supply apparatus includes a first controlling unit. The second power supply apparatus is parallel with the first power supply apparatus, and includes a second controlling unit. When the first power supply apparatus and the second power supply apparatus are both enabled, the first power supply apparatus and the second power supply apparatus provide electric energy to the system circuit at a predetermined power ratio. An operating status signal is transmitted from the second controlling unit to the first controlling unit through the first signal transmission line. A driving signal is transmitted from the first controlling unit to the second controlling unit through the second signal transmission line. When the operating status signal is in an enabling status, the first controlling unit calculates the total output electric quantity according to the electric quantity outputted from the first power supply apparatus and the predetermined power ratio, thereby judging whether the system circuit is in a light load condition. If the first controlling unit judges that the system circuit is in the light load condition, the driving signal outputted from the first controlling unit is changed to a disabling status and transmitted to the second controlling unit, so that the second power supply apparatus is disabled.

In accordance with a further aspect of the present invention, there is provided a power supply system. The power supply system includes a first power supply apparatus, a second power supply apparatus, a first signal transmission line and a second signal transmission line. The first power supply apparatus includes a front-stage power circuit, a bus capacitor, a standby power circuit, a protecting circuit, a auxiliary switching circuit and a first controlling unit. The front-stage power circuit is used for converting electric energy of an input voltage. The bus capacitor is electrically connected with the front-stage power circuit. The standby power circuit is used for outputting a standby voltage. The protecting circuit is electrically connected between the front-stage power circuit and the standby power circuit for flowing electric current in only one direction. The auxiliary switching circuit is electrically connected between the bus capacitor and the standby power circuit. The first controlling unit is used for controlling operations of the front-stage power circuit and the auxiliary switching circuit. When the input voltage is normal but the front-stage power circuit is disabled, the auxiliary switching circuit is turned off under control of the first controlling unit, so that electric energy of the input voltage is transmitted to an input terminal of the standby power circuit through the protecting circuit. The second power supply apparatus is parallel with the first power supply apparatus, and includes a second controlling unit. When the first power supply apparatus and the second power supply apparatus are both enabled, the first power supply apparatus and the second power supply apparatus provide electric energy to the system circuit at a predetermined power ratio. An operating status signal is transmitted from the second controlling unit to the first controlling unit through the first signal transmission line. A driving signal is transmitted from the first controlling unit to the second controlling unit through the second signal transmission line. When the operating status signal is in an enabling status, the first controlling unit calculates the total output electric quantity according to the electric quantity outputted from the first power supply apparatus and the predetermined power ratio, thereby judging whether the system circuit is in a light load condition. If the first controlling unit judges that the system circuit is in the light load condition, the driving signal outputted from the first controlling unit is changed to a disabling status and transmitted to the second controlling unit, so that the second power supply apparatus is disabled.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a power supply system. The power supply system has an (n+1) redundancy configuration composed of plural power supply apparatuses. The number of the power supply apparatuses is not restricted. Hereinafter, the power supply system of the present invention will be illustrated by referring a 1+1 redundancy configuration with two power supply apparatuses. In the 1+1 redundancy configuration, the first power supply apparatus is an active power supply apparatus, and the second power supply apparatus is a standby power supply apparatus.

Figure 2:
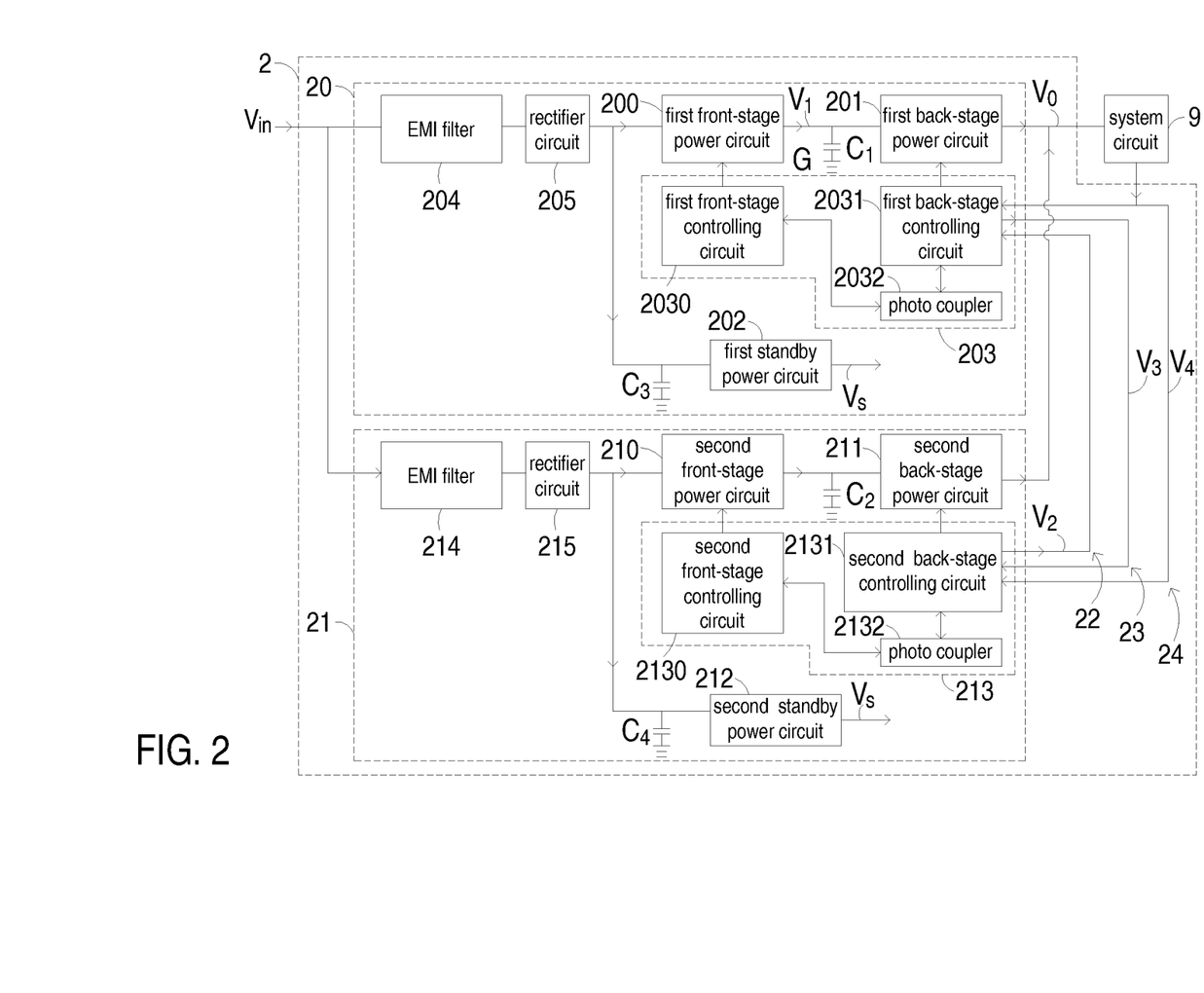
FIG. 2 is a schematic circuit block diagram illustrating a power supply system with plural power supply apparatuses according to an embodiment of the present invention.

FIG. 2 is a schematic circuit block diagram illustrating a power supply system with plural power supply apparatuses according to an embodiment of the present invention. As shown in FIG. 2, the power supply system 2 has a redundancy configuration composed of plural power supply apparatuses. The power supply system 2 is configured to receive an input voltage Vin and produce a rated output voltage Vo to a system circuit 9. In this embodiment, the power supply system 2 comprises a first power supply apparatus 20, a second power supply apparatus 21, a first signal transmission line 22, a second signal transmission line 23 and a third signal transmission line 24.

The first power supply apparatus 20 and the second power supply apparatus 21 are connected with each other in parallel. The output terminals of the first power supply apparatus 20 and the second power supply apparatus 21 are connected with the system circuit 9. The first power supply apparatus 20 is an active power supply apparatus. The first power supply apparatus 20 comprises a first front-stage power circuit 200, a first back-stage power circuit 201, a first standby power circuit 202, a first controlling unit 203 and a first bus capacitor C1.

The first front-stage power circuit 200 is electrically connected with an input terminal of the first power supply apparatus 20 for converting the input voltage Vin into a bus voltage V1 (e.g. 400 volts). An example of the first front-stage power circuit 200 includes but is not limited to an AC-to-DC converter. In addition, the first front-stage power circuit 200 has a power factor correction function.

The first back-stage power circuit 201 is interconnected between the output terminal of the first front-stage power circuit 200 and the output terminal of the first power supply apparatus 20 for converting the bus voltage V1 into the output voltage Vo. An example of the first back-stage power circuit 201 includes but is not limited to a DC-to-DC converter.

The first bus capacitor C1 is interconnected between the output terminal of the first front-stage power circuit 200 and a ground terminal G. The first bus capacitor C1 may be charged by the electric energy of the bus voltage V1. In addition, the bus voltage V1 may be filtered by the first bus capacitor C1.

The first controlling unit 203 is electrically connected with a first front-stage switching circuit (not shown) of the first front-stage power circuit 200 and a first back-stage switching circuit (not shown) of the first back-stage power circuit 201. The first controlling unit 203 is used for controlling on/off statuses of the first front-stage switching circuit and the first back-stage switching circuit, thereby controlling operations of the first front-stage power circuit 200 and the first back-stage power circuit 201. In this embodiment, the first controlling unit 203 comprises a first front-stage controlling circuit 2030 and a first back-stage controlling circuit 2031. The first front-stage controlling circuit 2030 is used for controlling the on/off statuses of the first front-stage switching circuit, thereby controlling operations of the first front-stage power circuit 200. The first back-stage controlling circuit 2031 is used for controlling the on/off statuses of the first back-stage switching circuit, thereby controlling operations of the first back-stage power circuit 201.

The first standby power circuit 202 is electrically connected with the input terminal of the first power supply apparatus 20 and the input terminal of the first front-stage power circuit 200 for converting the input voltage Vin into a standby voltage Vs (e.g. 5 volts). The standby voltage Vs may provide electric energy required for powering the internal circuitry or electronic components of the first power supply apparatus 20, for example the first front-stage controlling circuit 2030 and the first back-stage controlling circuit 2031. In a case that the first power supply apparatus 20 is in a powered-on mode, the standby voltage Vs may provide the electric energy for starting the first power supply apparatus 20.

The second power supply apparatus 21 is a standby power supply apparatus. The second power supply apparatus 21 is connected with the first power supply apparatus 20 in parallel for providing electric energy to the system circuit 9. In a case that the first power supply apparatus 20 and the second power supply apparatus 21 are both enabled, the first power supply apparatus 20 and the second power supply apparatus 21 provide electric energy to the system circuit 9 at a predetermined power ratio. In an embodiment, the predetermined power ratio is 1:1, so that the electric energy provided by the first power supply apparatus 20 to the system circuit 9 and the electric energy provided by the second power supply apparatus 21 to the system circuit 9 are substantially equal. Whereas, in a case that the predetermined power ratio is 2:1, the electric energy provided by the first power supply apparatus 20 to the system circuit 9 and the electric energy provided by the second power supply apparatus 21 to the system circuit 9 are in the ratio of 2:1.

The second power supply apparatus 21 comprises a second front-stage power circuit 210, a second back-stage power circuit 211, a second standby power circuit 212, a second controlling unit 213 and a second bus capacitor C2.

The second controlling unit 213 comprises a second front-stage controlling circuit 2130 and a second back-stage controlling circuit 2131. The operating principles of the second front-stage power circuit 210, the second back-stage power circuit 211, the second standby power circuit 212, the second controlling unit 213 and the second bus capacitor C2 of the second power supply apparatus 21 are respectively similar to those of the first front-stage power circuit 200, the first back-stage power circuit 201, the first standby power circuit 202, the first controlling unit 203 and the first bus capacitor C1 of the first power supply apparatus 20, and are not redundantly described herein. The operating principles of the second front-stage controlling circuit 2130 and the second back-stage controlling circuit 2131 of the second controlling unit 213 are respectively similar to those of the first front-stage controlling circuit 2030 and the first back-stage controlling circuit 2031 of the first controlling unit 203, and are not redundantly described herein.

The first controlling unit 203 of the first power supply apparatus 20 is in communication with the second controlling unit 213 of the second power supply apparatus 21 through the first signal transmission line 22. Through the first signal transmission line 22, an operating status signal V2 may be transmitted from the second controlling unit 213 to the first controlling unit 203. According to the operating status signal V2, the first controlling unit 203 may realize whether the second power supply apparatus 21 is enabled or disabled. In this embodiment, the first back-stage controlling circuit 2031 of the first controlling unit 203 is in communication with the second back-stage controlling circuit 2131 of the second controlling unit 213 through the first signal transmission line 22. That is, the operating status signal V2 is transmitted from the second back-stage controlling circuit 2131 to the first back-stage controlling circuit 2031 through the first signal transmission line 22.

The first controlling unit 203 of the first power supply apparatus 20 is also in communication with the second controlling unit 213 of the second power supply apparatus 21 through the second signal transmission line 23. Through the second signal transmission line 23, a driving signal V3 may be transmitted from the second controlling unit 213 to the first controlling unit 203. According to the driving signal V3, the second controlling unit 213 may control operations of the second front-stage power circuit 210 and the second back-stage power circuit 211, and thus control operations of the second power supply apparatus 21. In this embodiment, the first back-stage controlling circuit 2031 of the first controlling unit 203 is in communication with the second back-stage controlling circuit 2131 of the second controlling unit 213 through the second signal transmission line 23. That is, the driving signal V3 is transmitted from the second back-stage controlling circuit 2131 to the first back-stage controlling circuit 2031 through the second signal transmission line 23.

The first controlling unit 203, the second controlling unit 213 and the system circuit 9 are in communication with each other through the third signal transmission line 24. Through the third signal transmission line 24, a start signal V4 may be transmitted from the system circuit 9 to the second controlling unit 213 and the first controlling unit 203. When the system circuit 9 is turned on, the start signal V4 issued from the system circuit 9 is changed from a disabling status to an enabling status. In response to the start signal V4 in the enabling status, the first controlling unit 203 will enable the first front-stage power circuit 200 and the first back-stage power circuit 201, and thus enable the first power supply apparatus 20. Similarly, in response to the start signal V4 in the enabling status, the second controlling unit 213 will enable the second front-stage power circuit 210 and the second back-stage power circuit 211, and enable the second power supply apparatus 21.

Hereinafter, the operations of the power supply system 2 will be illustrated with reference to FIG. 2. When the system circuit 9 is turned on, the start signal V4 issued from the system circuit 9 is changed from a disabling status to an enabling status. The start signal V4 is transmitted to the first controlling unit 203 and the second controlling unit 213 through the third signal transmission line 24. In response to the start signal V4 in the enabling status, the first controlling unit 203 and the second controlling unit 213 will enable the first power supply apparatus 20 and the second power supply apparatus 21. As a result, the first power supply apparatus 20 and the second power supply apparatus 21 provide electric energy to the system circuit 9 at the predetermined power ratio. Meanwhile, the operating status signal V2 outputted from the second controlling unit 213 of the second power supply apparatus 21 is changed to an enabling status and transmitted to the first controlling unit 203 through the first signal transmission line 22. According to the operating status signal V2 in the enabling status, the first controlling unit 203 may realize that the second power supply apparatus 21 is enabled. Meanwhile, according to the electric quantity outputted from the first power supply apparatus 20 and the predetermined power ratio, the first controlling unit 203 may calculate the power consumption amount of the system circuit 9, thereby judging whether the system circuit 9 is in a light load condition. In this embodiment, the light load condition indicates that the power consumption amount of the system circuit 9 is lower than 40 percentage of the rated power supply amount of the first power supply apparatus 20. If the first controlling unit 203 judges that the system circuit 9 is in the light load condition, the driving signal V3 outputted from the first controlling unit 203 is changed to a disabling status and transmitted to the second controlling unit 213 through the second signal transmission line 23. According to the driving signal V3 in the disabling status, the second power supply apparatus 21 is disabled under control of the second controlling unit 213. Under this circumstance, the electric energy required for powering the system circuit 9 is completely provided by the first power supply apparatus 20. As a consequence, the power efficiency of the first power supply apparatus 20 is enhanced and the overall operating efficiency of the power supply system 2 is enhanced.

For example, in a case that the predetermined power ratio is 1:1, the electric energy provided by the first power supply apparatus 20 to the system circuit 9 and the electric energy provided by the second power supply apparatus 21 to the system circuit 9 are substantially equal. According to the operating status signal V2 in the enabling status, the first controlling unit 203 may realize that the second power supply apparatus 21 is enabled. Meanwhile, according to the electric quantity outputted from the first power supply apparatus 20 and the predetermined power ratio, the first controlling unit 203 may calculate the power consumption amount of the system circuit 9 by doubling the current electric energy outputted from the first power supply apparatus 20. According to the power consumption amount of the system circuit 9, the first controlling unit 203 can judge whether the system circuit 9 is in the light load condition.

In a case that the second power supply apparatus 21 is disabled and the electric energy required for powering the system circuit 9 is completely provided by the first power supply apparatus 20, the operating status signal V2 in the disabling status is transmitted from the second controlling unit 213 of the second power supply apparatus 21 to the first controlling unit 203 through the first signal transmission line 22. According to the operating status signal V2 in the disabling status, the first controlling unit 203 realizes that the second power supply apparatus 21 is disabled. Meanwhile, according to the electric quantity outputted from the first power supply apparatus 20, the first controlling unit 203 may calculate the power consumption amount of the system circuit 9, thereby judging whether the system circuit 9 is in a heavy load condition. In this embodiment, the heavy load condition indicates that the power consumption amount of the system circuit 9 is higher than 80 percentage of the rated power supply amount of the first power supply apparatus 20. If the first controlling unit 203 judges that the system circuit 9 is in the heavy load condition, the driving signal V3 outputted from the first controlling unit 203 is changed to an enabling status and transmitted to the second controlling unit 213 through the second signal transmission line 23. According to the driving signal V3 in the enabling status, the second power supply apparatus 21 is enabled again under control of the second controlling unit 213. Under this circumstance, the first power supply apparatus 20 and the second power supply apparatus 21 provide electric energy to the system circuit 9 at the predetermined power ratio. As a consequence, the overall power supply amount of the power supply system 2 is enhanced.

From the above description, the power supply system 2 of the present invention has enhanced power efficiency and reliable redundancy power supply efficacy. Through the first signal transmission line 22 and the second signal transmission line 23, the proper number of power supply apparatuses of the power supply system 2 will be enabled according to the power consumption amount of the system circuit 9. As a consequence, the power efficiency of the power supply system 2 is enhanced without the need of installing an additional power distribution unit, and the cost of the power supply system is reduced.

In some embodiments, the input voltage Vin is received by an AC voltage source (e.g. a utility source). Correspondingly, the first power supply apparatus 20 comprises a first electromagnetic interference (EMI) filter 204 and a first rectifier circuit 205. The first EMI filter 204 is connected with the input terminal of the first power supply apparatus 20 for filtering off the electromagnetic noise contained in the input voltage Vin. The first rectifier circuit 205 is electrically connected between the first EMI filter 204 and the first front-stage power circuit 200 for rectifying the input voltage Vin.

In some embodiments, the first power supply apparatus 20 further comprises a first filtering capacitor C3. The first filtering capacitor C3 is electrically connected with the input terminal of the first standby power circuit 202 for filtering the electric energy received by the input terminal of the first standby power circuit 202. Moreover, the first controlling unit 203 further comprises a photo coupler 2032. The photo coupler 2032 is electrically connected between the first front-stage controlling circuit 2030 and the first back-stage controlling circuit 2031. Through the photo coupler 2032, the operating status information of the first front-stage controlling circuit 2030 and the operating status information of the first back-stage controlling circuit 2031 can be acquired by each other.

Moreover, when the first power supply apparatus 20 is turned off, the first front-stage power circuit 200 and the first back-stage power circuit 201 may be also turned off. That is, by reducing the operating loss of the first front-stage power circuit 200 and the first back-stage power circuit 201, the power-saving efficacy of the first power supply apparatus 20 is enhanced. In addition, the first power supply apparatus 20 may be instantly started when it is turned on. Please refer to FIG. 3. The first power supply apparatus 20 further comprises a first auxiliary switching circuit 206 and a first protecting circuit 207. The first front-stage controlling circuit 2030 of the first controlling unit 203 is further electrically connected with the control terminal of the first auxiliary switching circuit 206. The first auxiliary switching circuit 206 is electrically connected between the output terminal of the first front-stage power circuit 200 and the first standby power circuit 202, and further electrically connected with the first protecting circuit 207. The on/off statuses of the first auxiliary switching circuit 206 are controlled by the first front-stage controlling circuit 2030. An example of the first auxiliary switching circuit 206 includes but is not limited to a metal oxide semiconductor field effect transistor (MOSFET) such as a p-type MOSFET.

Figure 3:
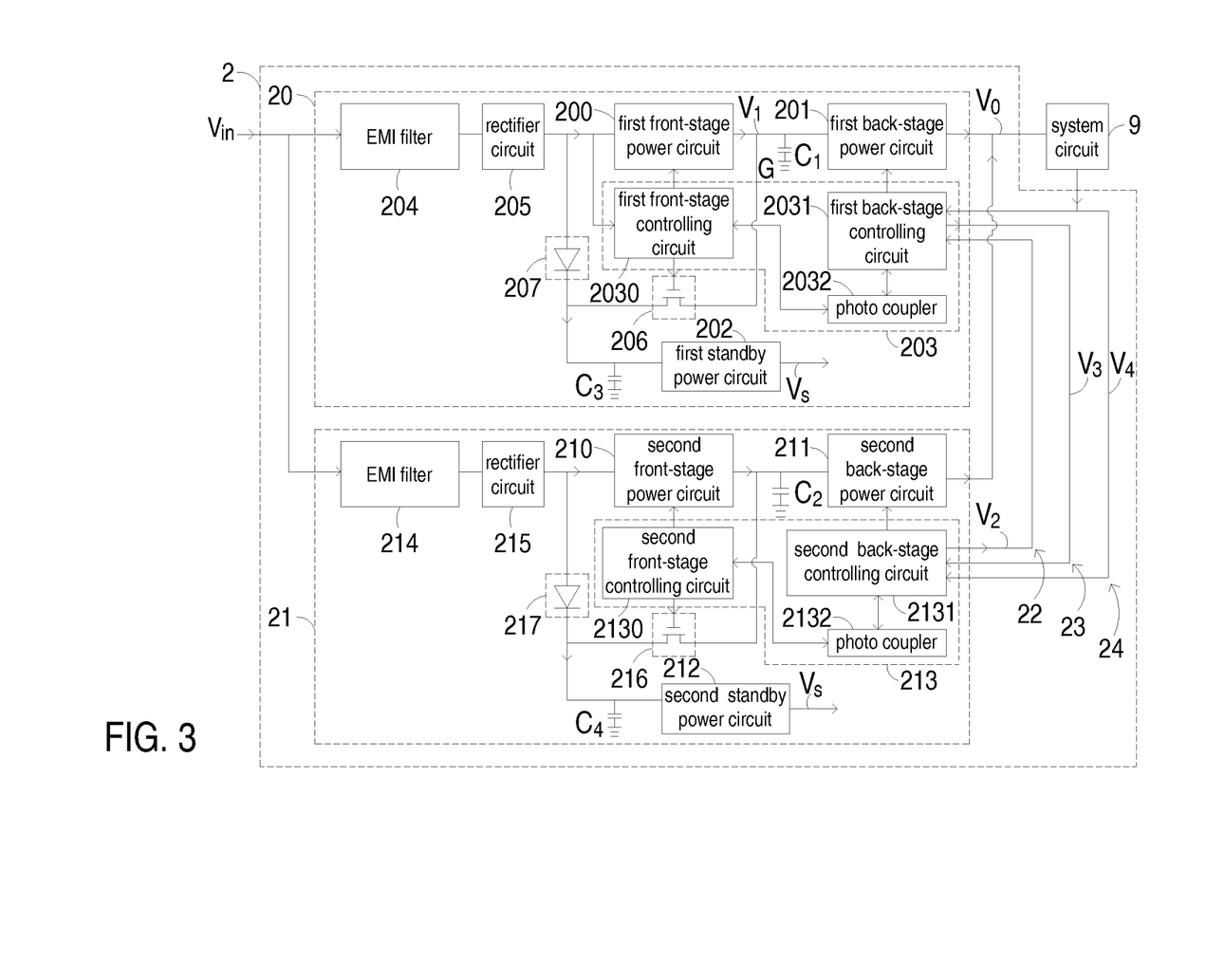
FIG. 3 is a schematic circuit block diagram illustrating a power supply system with plural power supply apparatuses according to another embodiment of the present invention.

The first protecting circuit 207 is electrically connected between the input terminal of the first front-stage power circuit 200 and the first standby power circuit 202 for flowing electric current in only one direction. Consequently, when the first auxiliary switching circuit 206 is turned on, the electric current fails to flow to the input terminal of the first front-stage power circuit 200. In addition, through the first protecting circuit 207, the electric energy of the input voltage Vin will be transmitted to the first standby power circuit 202. An example of the first protecting circuit 207 includes but is not limited to a diode.

When the input voltage Vin is normal, the first auxiliary switching circuit 206 is selectively turned on or turned off under control of the first front-stage controlling circuit 2030 of the first controlling unit 203 according to the operating status of the first front-stage power circuit 200. For example, when the input voltage Vin is normal and the first front-stage power circuit 200 is enabled, the first auxiliary switching circuit 206 is turned on under control of the first front-stage controlling circuit 2030.

That is, in a case that the input voltage Vin is normal and the first power supply apparatus 20 is enabled, the first front-stage power circuit 200 and the first back-stage power circuit 201 are respectively enabled under control of the first front-stage controlling circuit 2030 and the first back-stage controlling circuit 2031 of the first controlling unit 203. In addition, since the first front-stage power circuit 200 is enabled, the first auxiliary switching circuit 206 is turned on under control of the first front-stage controlling circuit 2030. Under this circumstance, the electric energy of the bus voltage V1 outputted from the first front-stage power circuit 200 will be transmitted to the first bus capacitor C1 and stored in the first bus capacitor C1. At the same time, the electric energy of the bus voltage V1 is continuously transmitted to the first standby power circuit 202 through the first auxiliary switching circuit 206. Consequently, the bus voltage V1 is converted into the standby voltage Vs by the first standby power circuit 202.

Whereas, in a case that the first power supply apparatus 20 is disabled, the first front-stage power circuit 200 and the first back-stage power circuit 201 are respectively disabled under control of the first front-stage controlling circuit 2030 and the first back-stage controlling circuit 2031 of the first controlling unit 203. By reducing the operating loss of the first front-stage power circuit 200 and the first back-stage power circuit 201, the power-saving efficacy of the first power supply apparatus 20 is enhanced. In addition, since the first front-stage power circuit 200 is disabled, the first auxiliary switching circuit 206 is turned off under control of the first front-stage controlling circuit 2030. Under this circumstance, the electric energy of the input voltage Vin will be transmitted to the first standby power circuit 202 through the first protecting circuit 207 and converted into the standby voltage Vs by the first standby power circuit 202. Meanwhile, the electric storage stored in the first bus capacitor C1 is maintained without being consumed by the first standby power circuit 202. At the same time, the standby voltage Vs can be continuously outputted from the first standby power circuit 202. When the first power supply apparatus 20 is turned on again, the first power supply apparatus 20 can be instantly started without response delay.

In a case that the electric energy of the input voltage Vin received by the second power supply apparatus 21 and the first front-stage power circuit 200 is abnormal (e.g. interrupted) and the first front-stage power circuit 200 is disabled, the first front-stage controlling circuit 2030 of the first controlling unit 203 is further electrically connected with the input terminal of the first front-stage power circuit 200 (see FIG. 3) to detect whether the input voltage Vin received by the first front-stage power circuit 200 is normal and control the on/off statuses of the first auxiliary switching circuit 206 according to the detecting result. In such way, even if the electric energy of the input voltage Vin or the electric energy of the bus voltage V1 fails to be received by the first standby power circuit 202, the first standby power circuit 202 may still output the standby voltage Vs. For example, if the first front-stage controlling circuit 2030 detects that the input voltage Vin received by the first front-stage power circuit 200 is normal, the first auxiliary switching circuit 206 is turned off under control of the first front-stage controlling circuit 2030. On the other hand, if the first front-stage controlling circuit 2030 detects that the input voltage Vin received by the first front-stage power circuit 200 is abnormal, the first auxiliary switching circuit 206 is turned on under control of the first front-stage controlling circuit 2030. That is, if the input voltage Vin received by the first front-stage power circuit 200 is abnormal, the first auxiliary switching circuit 206 is turned on under control of the first front-stage controlling circuit 2030. Under this circumstance, the electric energy stored in the first bus capacitor C1 can be transmitted to the first standby power circuit 202 through the first auxiliary switching circuit 206. In addition, the electric energy stored in the first bus capacitor C1 is converted into the standby voltage Vs by the first standby power circuit 202. Consequently, the standby voltage Vs may be outputted for a certain time period.

Similarly, the second power supply apparatus 21 comprises a second EMI filter 214, a second rectifier circuit 215, a second auxiliary switching circuit 216, a second protecting circuit 217 and a second filtering capacitor C4. The second controlling unit 213 further comprises a photo coupler 2132. The operating functions and the functions of the second EMI filter 214, the second rectifier circuit 215, the second auxiliary switching circuit 216, the second protecting circuit 217, the second filtering capacitor C4 and the photo coupler 2132 of the second power supply apparatus 21 are similar to those of the first EMI filter 204, the first rectifier circuit 205, the first auxiliary switching circuit 206, the first protecting circuit 216, the first filtering capacitor C3 and the photo coupler 2032 of the first power supply apparatus 21, and are not redundantly described herein.

From the above description, the present invention provides a power supply apparatus and a power supply system with plural power supply apparatuses. Through the first signal transmission line and the second signal transmission line, the proper number of power supply apparatuses of the power supply system will be enabled according to the power consumption amount of the system circuit. As a consequence, the power efficiency of the power supply system is enhanced without the need of installing an additional power distribution unit, and the cost of the power supply system is reduced. Moreover, in a case that the input voltage received by the power supply apparatus is normal, the electric energy of the input voltage is converted into a standby voltage by the standby power circuit. Whereas, in a case that the input voltage received by the power supply apparatus is abnormal, the electric energy stored in the bus capacitor is converted into the standby voltage by the standby power circuit. That is, when the power supply apparatus is turned off, the front-stage power circuit and the back-stage power circuit will be turned off under control of the controlling unit. That is, by reducing the operating loss of the front-stage power circuit, the power-saving efficacy of the power supply apparatus is enhanced. When the power supply apparatus is turned on again, the power supply apparatus can be instantly started without response delay.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus for converting electric energy of an input voltage to be provided to a system circuit, said power supply apparatus comprising:
    a front-stage power circuit for converting said input voltage into a bus voltage;
    a bus capacitor electrically connected with said front-stage power circuit;
    a standby power circuit for outputting a standby voltage;
    a protecting circuit electrically connected between said front-stage power circuit and said standby power circuit for flowing electric current in only one direction;
    an auxiliary switching circuit electrically connected between said bus capacitor and said standby power circuit; and
    a controlling unit electrically connected with said auxiliary switching circuit and said front-stage power circuit for controlling operations of said front-stage power circuit and said auxiliary switching circuit, wherein when said input voltage is normal but said front-stage power circuit is disabled, said auxiliary switching circuit is turned off under control of said controlling unit, so that electric energy of said input voltage is transmitted to an input terminal of said standby power circuit through said protecting circuit.

2. The power supply apparatus according to claim 1 wherein when said input voltage is normal and said front-stage power circuit is disabled, said auxiliary switching circuit is turned on under control of said controlling unit, so that electric energy of said bus voltage is transmitted to said input terminal of said standby power circuit through said auxiliary switching circuit.

3. The power supply apparatus according to claim 1 wherein said controlling unit is further connected with an input terminal of said front-stage power circuit for detecting whether said input voltage received by said front-stage power circuit is normal, wherein if said input voltage is abnormal, said auxiliary switching circuit is turned on under control of said controlling unit, so that electric energy stored in said bus capacitor is transmitted to said input terminal of said standby power circuit through said auxiliary switching circuit.

4. The power supply apparatus according to claim 1 wherein said power supply apparatus further comprises a back-stage power circuit, which is electrically connected with said front-stage power circuit and said controlling unit for converting said bus voltage into an output voltage under control of said controlling unit.

5. The power supply apparatus according to claim 4 wherein said controlling unit comprises:
   a first front-stage controlling circuit for controlling said front-stage power circuit and said auxiliary switching circuit; and
   a first back-stage controlling circuit for controlling said back-stage power circuit.

6. The power supply apparatus according to claim 5 wherein said controlling unit further comprises a photo coupler, which is electrically connected between said front-stage controlling circuit and said back-stage controlling circuit, wherein through said photo coupler, operating status information of said first front-stage controlling circuit and operating status information of said first back-stage controlling circuit are acquired by each other.

7. A power supply system for providing a total output electric quantity to a system circuit, said power supply system comprising:
   a first power supply apparatus comprising a first controlling unit;
   a second power supply apparatus parallel with said first power supply apparatus, and comprising a second controlling unit, wherein when said first power supply apparatus and said second power supply apparatus are both enabled, said first power supply apparatus and said second power supply apparatus provide electric energy to said system circuit at a predetermined power ratio;
   a first signal transmission line, wherein an operating status signal is transmitted from said second controlling unit to said first controlling unit through said first signal transmission line; and
   a second signal transmission line, wherein a driving signal is transmitted from said first controlling unit to said second controlling unit through said second signal transmission line,
   wherein when said operating status signal is in an enabling status, said first controlling unit calculates said total output electric quantity according to said electric quantity outputted from said first power supply apparatus and said predetermined power ratio, thereby judging whether said system circuit is in a light load condition, wherein if said first controlling unit judges that said system circuit is in said light load condition, said driving signal outputted from said first controlling unit is changed to a disabling status and transmitted to said second controlling unit, so that said second power supply apparatus is disabled.

8. The power supply system according to claim 7 wherein when said operating status signal is in a disabling status, said first controlling unit calculates said total output electric quantity according to said electric quantity outputted from said first power supply apparatus, thereby judging whether said system circuit is in a high load condition, wherein if said first controlling unit judges that said system circuit is in said heavy load condition, said driving signal outputted from said first controlling unit is changed to an disabling status and transmitted to said second controlling unit, so that said second power supply apparatus is enabled.

9. The power supply system according to claim 8 wherein said operating status signal in said disabling status indicates that said second power supply apparatus is disabled, and said operating status signal in said enabling status indicates that said second power supply apparatus is enabled.

10. The power supply system according to claim 7 wherein said power supply system further comprises a third signal transmission line, which is connected with said system circuit, said first controlling unit and said second controlling unit, wherein through said third signal transmission line, a start signal indicating whether said system circuit is turned on is transmitted from said system circuit to said first controlling unit and said second controlling unit.

11. The power supply system according to claim 7 wherein said first controlling unit comprises:
   a first front-stage controlling circuit for controlling a first front-stage power circuit of said first power supply apparatus; and
   a first back-stage controlling circuit for controlling a first back-stage power circuit of said first power supply apparatus.

12. The power supply system according to claim 11 wherein said second controlling unit comprises:
   a second front-stage controlling circuit for controlling a second front-stage power circuit of said second power supply apparatus; and
   a second back-stage controlling circuit for controlling a second back-stage power circuit of said second power supply apparatus.

13. The power supply system according to claim 12 wherein said first signal transmission line is connected with said first back-stage controlling circuit and said second back-stage controlling circuit, wherein said operating status signal is outputted from said second back-stage controlling circuit, and said driving signal is outputted from said first back-stage controlling circuit.

14. The power supply system according to claim 7 wherein said predetermined power ratio is 1:1.

15. A power supply system, comprising:
   a first power supply apparatus comprising:
      a front-stage power circuit for converting electric energy of an input voltage;
      a bus capacitor electrically connected with said front-stage power circuit;
      a standby power circuit for outputting a standby voltage;
      a protecting circuit electrically connected between said front-stage power circuit and said standby power circuit for flowing electric current in only one direction;
      an auxiliary switching circuit electrically connected between said bus capacitor and said standby power circuit; and
      a first controlling unit for controlling operations of said front-stage power circuit and said auxiliary switching circuit, wherein when said input voltage is normal but said front-stage power circuit is disabled, said auxiliary switching circuit is turned off under control of said first controlling unit, so that electric energy of said input voltage is transmitted to an input terminal of said standby power circuit through said protecting circuit;
   a second power supply apparatus parallel with said first power supply apparatus, and comprising a second controlling unit, wherein when said first power supply apparatus and said second power supply apparatus are both enabled, said first power supply apparatus and said second power supply apparatus provide electric energy to said system circuit at a predetermined power ratio;

a first signal transmission line, wherein an operating status signal is transmitted from said second controlling unit to said first controlling unit through said first signal transmission line; and a second signal transmission line, wherein a driving signal is transmitted from said first controlling unit to said second controlling unit through said second signal transmission line, wherein when said operating status signal is in an enabling status, said first controlling unit calculates said total output electric quantity according to said electric quantity outputted from said first power supply apparatus and said predetermined power ratio, thereby judging whether said system circuit is in a light load condition, wherein if said first controlling unit judges that said system circuit is in said light load condition, said driving signal outputted from said first controlling unit is changed to a disabling status and transmitted to said second controlling unit, so that said second power supply apparatus is disabled.

* * * * *